(12) United States Patent
Bischoff

(10) Patent No.: US 7,530,018 B2
(45) Date of Patent: May 5, 2009

(54) METHOD OF GENERATING PAGES IN A MARKUP LANGUAGE FOR SELECTING PRODUCTS AND A SOFTWARE TOOL

(75) Inventor: Toni Gerhard Bischoff, Petersaurach (DE)

(73) Assignee: Siemens AG, Munich (DE)

( * ) Notice: Subject to any disclaimer, the term of this patent is extended or adjusted under 35 U.S.C. 154(b) by 1035 days.

(21) Appl. No.: 10/323,928

(22) Filed: Dec. 20, 2002

(65) Prior Publication Data

US 2003/0212955 A1 Nov. 13, 2003

(30) Foreign Application Priority Data

May 13, 2002 (DE) ................................ 102 21 178

(51) Int. Cl.
*G06F 17/00* (2006.01)
*G06F 17/30* (2006.01)

(52) U.S. Cl. .................. 715/255; 715/234; 715/264; 715/763; 707/4; 707/10; 707/104; 705/26; 705/80

(58) Field of Classification Search ................. 715/500, 715/513, 200, 204, 205, 207, 234, 265, 273, 715/275, 206, 209, 210, 255, 256, 733, 738, 715/760, 762, 763, 967, 968, 201; 705/26–28, 705/7, 80; 75/26–28, 80; 707/1–4, 6, 7, 707/10, 100, 102, 104.1
See application file for complete search history.

(56) References Cited

U.S. PATENT DOCUMENTS

| | | | |
|---|---|---|---|
| 5,550,971 A | | 8/1996 | Brunner et al. |
| 5,765,142 A | * | 6/1998 | Allred et al. .................. 705/26 |
| 5,890,175 A | * | 3/1999 | Wong et al. .................. 715/505 |
| 5,905,496 A | * | 5/1999 | Lau et al. ..................... 715/835 |

(Continued)

FOREIGN PATENT DOCUMENTS

WO WO 01-33315 A2 5/2001

(Continued)

OTHER PUBLICATIONS

Volker Turau, "A Framework for Automatic Generation of Web-Based Data Entry Applications Based on XML";. ACM Symposium on Applied Computing (SAC Mar. 2002), Madrid Spain.

(Continued)

*Primary Examiner*—Doug Hutton
*Assistant Examiner*—Maikhanh Nguyen
(74) *Attorney, Agent, or Firm*—Sughrue Mion, PLLC

(57) ABSTRACT

A software tool for selecting products and a method of generating pages in a markup language for selecting products. The method includes: inputting attribute groups (2) into a databank (1), inputting attributes (3) into the databank, each attribute being assigned to one of the attribute groups, inputting product information (4) into the databank, each item of product information being assigned to at least one of the attributes, generating a page (41; 51) in the markup language for each of the attribute groups, wherein representations of the attributes are assigned to the relevant attribute group and input fields for a user to specify the attributes are generated on the page belonging to that attribute group, and storing of the pages in the markup language for access using a browser program (57).

21 Claims, 9 Drawing Sheets

U.S. PATENT DOCUMENTS

| | | | |
|---|---|---|---|
| 6,253,216 B1* | 6/2001 | Sutcliffe et al. | 715/500 |
| 6,453,255 B1* | 9/2002 | Smorodinsky et al. | 702/81 |
| 6,516,302 B1* | 2/2003 | Deaton et al. | 705/14 |
| 6,611,811 B1* | 8/2003 | Deaton et al. | 705/14 |
| 6,633,852 B1* | 10/2003 | Heckerman et al. | 705/27 |
| 6,785,671 B1* | 8/2004 | Bailey et al. | 707/3 |
| 6,810,401 B1* | 10/2004 | Thompson et al. | 707/101 |
| 6,871,196 B1* | 3/2005 | Chan et al. | 706/47 |
| 6,917,922 B1* | 7/2005 | Bezos et al. | 705/27 |
| 6,941,276 B2* | 9/2005 | Haeberli | 705/26 |
| 6,947,900 B2* | 9/2005 | Giordano et al. | 705/26 |
| 7,016,869 B1* | 3/2006 | Haeberli | 705/27 |
| 2002/0049763 A1* | 4/2002 | Seamon | 707/100 |
| 2002/0077930 A1* | 6/2002 | Trubey et al. | 705/26 |
| 2002/0087408 A1* | 7/2002 | Burnett | 705/14 |
| 2002/0095421 A1* | 7/2002 | Koskas | 707/100 |
| 2002/0111879 A1* | 8/2002 | Melero et al. | 705/26 |
| 2002/0138336 A1* | 9/2002 | Bakes et al. | 705/10 |
| 2002/0147715 A1* | 10/2002 | Beyer | 707/5 |
| 2002/0156688 A1* | 10/2002 | Horn et al. | 705/26 |
| 2002/0165799 A1* | 11/2002 | Jaffe et al. | 705/27 |
| 2002/0188634 A1* | 12/2002 | Proidl et al. | 707/513 |
| 2003/0204455 A1* | 10/2003 | Eck et al. | 705/29 |
| 2003/0212640 A1* | 11/2003 | Andresen et al. | 705/64 |
| 2004/0024656 A1* | 2/2004 | Coleman | 705/27 |
| 2004/0078281 A1* | 4/2004 | Morley et al. | 705/26 |
| 2004/0205604 A1* | 10/2004 | Read | 715/517 |
| 2005/0102201 A1* | 5/2005 | Linker et al. | 705/27 |

FOREIGN PATENT DOCUMENTS

| | | | |
|---|---|---|---|
| WO | WO-0182107 | * | 11/2001 |

OTHER PUBLICATIONS

P.M. Nadkarni, et al.: "WebEAV: Automatic Metadata-Driven Generation of Web Interfaces to Entity-Attribute-Value Databases." Journal of the American Medical Informatics Association: Jul.-Aug. 2000. Vol. 7, No. 4, Jul. 2000, p. 343-356. XP002376913 (ISSN: 1067-5027).

* cited by examiner

METHOD OF GENERATING PAGES IN A MARKUP LANGUAGE FOR SELECTING PRODUCTS AND A SOFTWARE TOOL

The following disclosure is based on German Patent Application No. 10221178.7, filed on May 13, 2002, which is incorporated into this application by reference.

FIELD OF AND BACKGROUND OF THE INVENTION

The present invention relates to a method of generating pages in a markup language for selecting products and further relates to an associated software tool. The invention relates, in particular, to such a method and software tool for offline and online platforms for customer information and product purchases.

Various product information systems and trade platforms are known from the related art, in particular for access via the Internet. Such platforms are likewise used for consumer goods as well as investment products.

Due to the continuously growing and ever faster-moving product palettes, it has become more difficult for buyers and sellers to find the product which fits their respective requirements. Selection aids and configurators may offer support, including reducing the need for technical consultation by professional consultants both before and after the purchase.

However, known selection aids and configurators suffer from the substantial outlay required for producing the necessary databanks, which must be produced and maintained in addition to the databanks that are required for catalogs, malls and manuals. This double outlay for data maintenance generates additional costs, delays the rollout of updates, and causes additional sources of error due to the need for duplicate inputs.

A further disadvantage of conventional selection aids and configurators is that the "look and feel" of the various web pages must be tailored to the respective company guidelines, i.e., the "corporate identity," through specific layouts. This also requires a significant outlay.

OBJECTS OF THE INVENTION

One object of the present invention is therefore to provide an improved method of generating pages for the selection of products in a markup language.

Another object is to provide an improved software tool associated with the inventive method.

SUMMARY OF THE INVENTION

These and other objects of the present invention are, according to one formulation, achieved by method of generating pages in a markup language for selecting products, which includes: (a) inputting attribute groups into a databank; (b) inputting attributes into the databank, each of the attributes being assigned to one of the attribute groups; (c) inputting product information into the databank, each item of the product information being assigned to at least one of the attributes; (d) generating a page in the markup language for each of the attribute groups, wherein representations of the attributes are assigned to the respective ones of the attribute groups, and input fields for a user to specify the attributes are generated on each of the pages associated with each of the attribute groups, respectively; and (e) storing the pages in the markup language for access with a browser program.

According to another formulation, the invention is directed to a software tool for selecting products, which includes: (a) pages in a markup language, wherein each of the pages is respectively associated with one of a plurality of attribute groups, and wherein each of the pages respectively includes both representations of attributes assigned to the one attribute group of the associated page and input fields for a user to select the represented attributes; and (b) a program module utilizing a browser program to perform at least one of displaying the pages, searching the pages, and analyzing the pages in the markup language.

The present invention allows efficient production and maintenance of a databank for the storage of product-related information. The databank contains attribute groups and product attributes associated with the various attribute groups.

For example, each attribute group is graphically symbolized by an "index card."

For example, the following attribute groups may be provided for the selection of products from the field of automation technology: Display, Communication, Functions, Inputs, Outputs, Keyboard Type, Processor, Operating System, Memory Configuration, Supply Voltage, Interfaces, Peripherals, Temperature Range, Certificates, Applications, Resistance, Password Protection, Archiving, Diagnosis, Languages, etc.

Each of these attribute groups is assigned specific attributes, which are used for specifying the product profile desired by the customer. For example, the attribute group "Display" is assigned the attributes: Graphic Display, Size (Height, Width), Colors, Permanent Window, and Character Height.

The attributes, in turn, are assigned product information, i.e., a list of products that have the relevant attribute.

According to a preferred embodiment of the present invention, format information is assigned to the attributes. This may be, for example, control characters which indicate whether an attribute is data in Boolean, integer, floating point, or list format. Each of the control characters is preferably assigned a graphic input symbol.

For example, the Boolean format is assigned a so-called radio button, whose actuation allows a yes/no selection to be input. For an attribute in the integer or floating point format, a value field without an entry is displayed. For an attribute of the list format, a pop-up or pull-down menu having a list of available selections of the relevant attribute is displayed.

According to a preferred embodiment of the present invention, each attribute group is assigned a graphic. Furthermore, graphics are also assigned to the individual attributes.

The generation of a page in a markup language for one of the attribute groups is performed, for example, in that, in the left column of the page, a list of the names of the attributes belonging to the attribute group of that page is generated, and the input fields assigned to the names of the attributes are generated in accordance with the attribute format control character. Furthermore, the graphic assigned to the attribute group is output on such a page.

For those attributes of the relevant attribute group for which further graphics exist, hyperlinks are generated on the page. By clicking such a hyperlink, the corresponding graphic is then output in the form of a separate page.

According to a further preferred embodiment of the present invention, the input of the specified attributes of the product profile desired by the customer is achieved by selecting a specific product. This then allows access to the databank, in order to permit the attribute information assigned to the product to be queried. This attribute information represents the search profile for the search for the appropriate products.

BRIEF DESCRIPTION OF THE DRAWINGS

In the following, preferred embodiments of the present invention are described in more detail with reference to the drawing, in which.

DETAILED DESCRIPTION OF THE PREFERRED EMBODIMENTS

Figure 1:
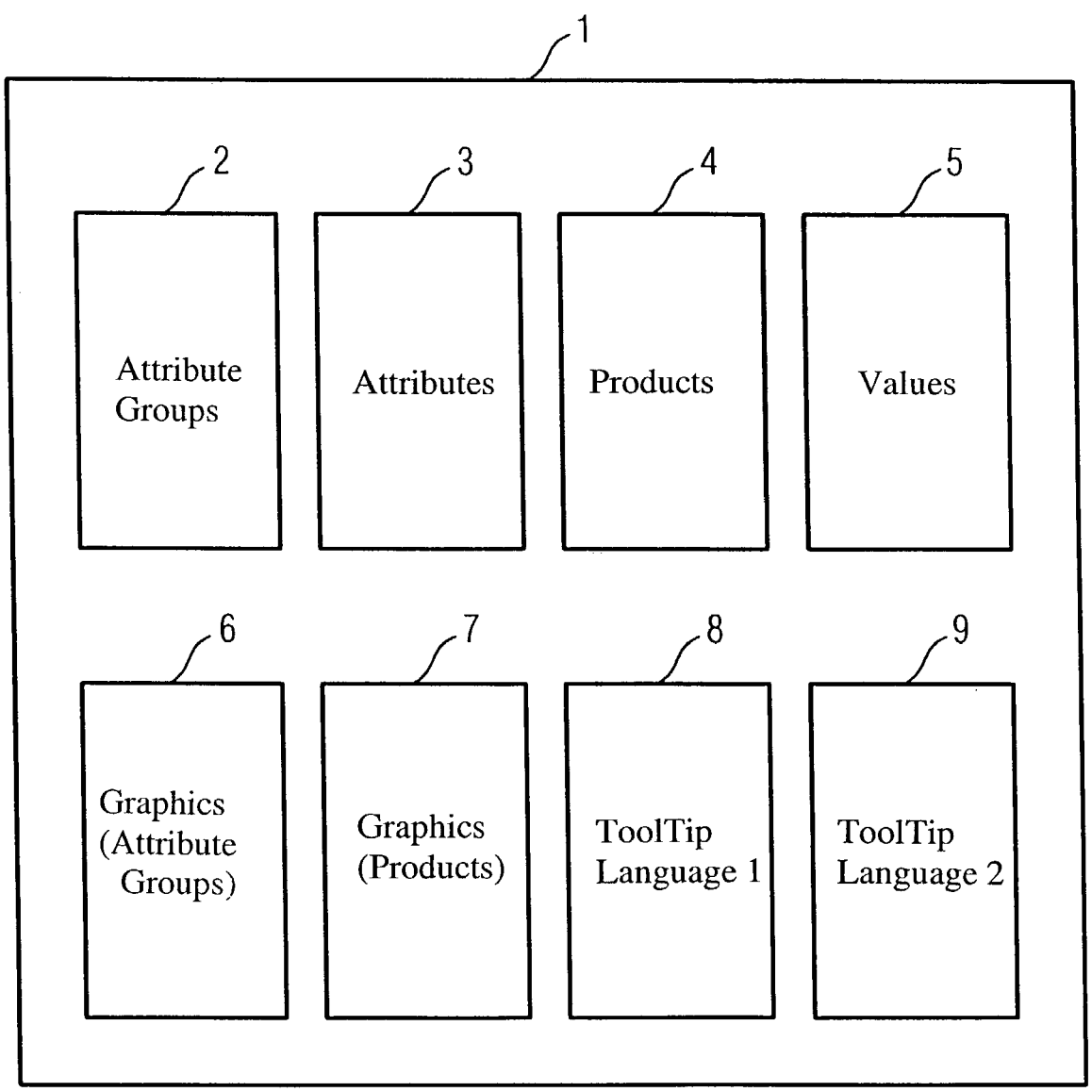
FIG. 1 shows a block diagram of a databank for storing attribute groups and attributes for products.

FIG. 1 shows a databank 1 having a databank list 2 for attribute groups. The databank 1 also has a databank list 3 for storing attributes, which are each assigned to one of the attribute groups stored in the databank list 2.

The attributes of the databank list 2 which are assigned to the attribute group "Display" are, for example, the attributes "Graphic Display," "Size," "Height," "Width," "Colors," "Number of Colors," "Permanent Window," and "Character Height." These attributes are preferably each assigned control characters having format information for the corresponding input fields.

The databank 1 also contains a databank list 4 for storing product information, i.e., a list of the available products. Each of the products is assigned to one or more of the attributes in the databank list 3 of the relational databank.

Alternatively, the information of the databank lists 2 to 9 is stored in a table, which contains the corresponding data fields for the information to be stored.

Furthermore, a databank list 5 for storing attribute values of the products of the databank list 4 is provided in the databank 1.

The databank lists 6 and 7 are used for storing graphics of the attribute groups and/or product graphics, which are assigned to individual attributes.

The databank lists 8 and 9 are used for storing ToolTips in different languages.

Figure 2:
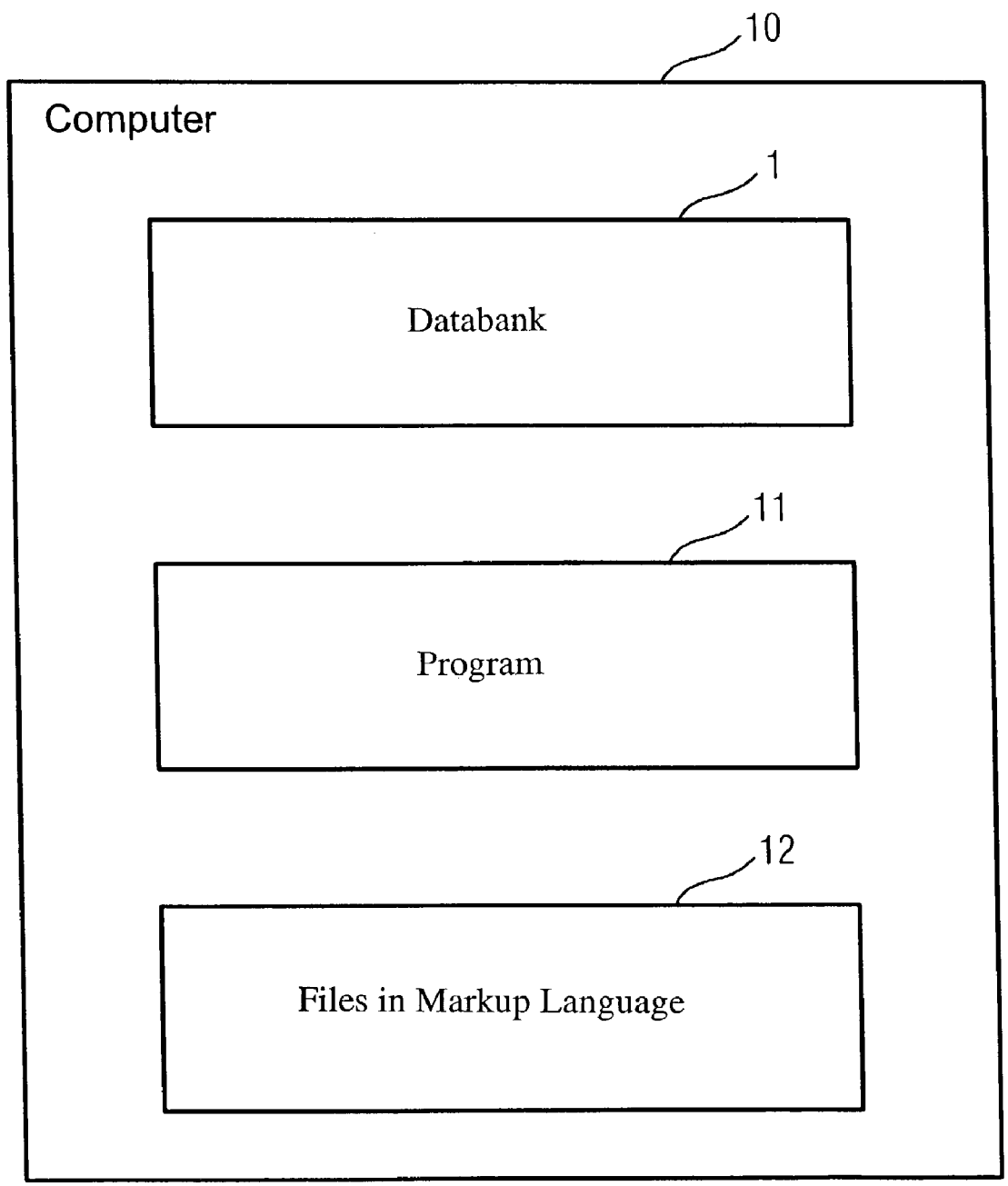
FIG. 2 shows a block diagram of a computer program for generating pages in a markup language according to the present invention.

FIG. 2 shows a block diagram of a computer 10, in which the databank 1 of FIG. 1 is stored. The computer 10 also contains a program 11 and a memory 12. The program 11 is used for accessing the databank 1, in order to generate a page in a markup language, such as HTML or XML, for each of the attribute groups.

A separate page is generated for each of the attribute groups, with the individual pages being identically constructed. Each page contains a list of the attributes that are assigned to each respective attribute group, as well as input fields for specifying the attributes.

By inputting attribute specifications, a user can define a product profile. Furthermore, graphics and/or hyperlinks may be integrated into each of the pages in accordance with a standardized layout. The resulting pages are stored in the memory 12 of the computer 10.

Figure 3:
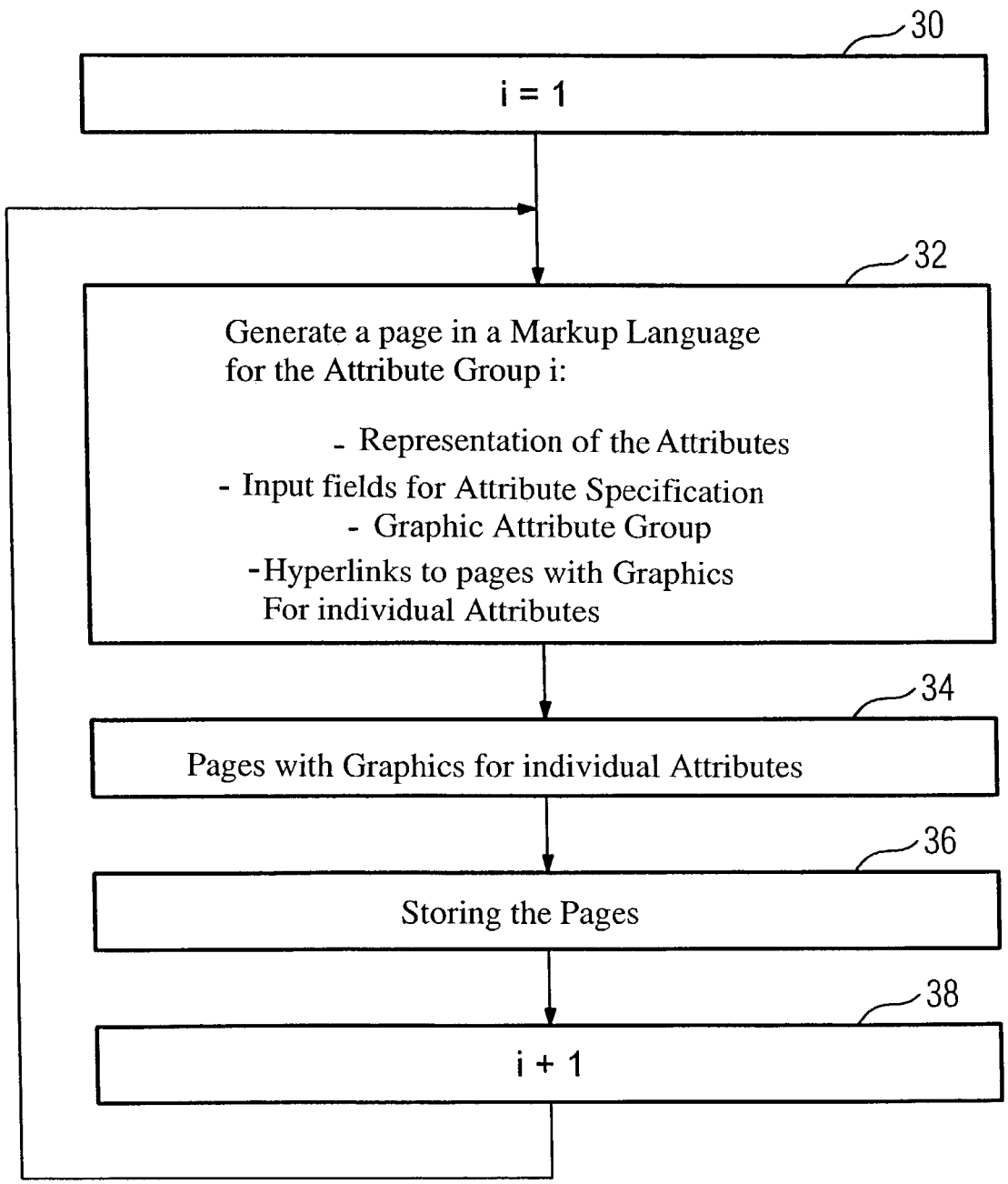
FIG. 3 shows a flowchart to illustrate the mode of operation of the computer program from FIG. 2.

FIG. 3 shows a corresponding flowchart.

In the step 30, an index i is initialized to 1. In the step 32, a page is generated in a markup language for the attribute group i. This is performed in such a way that a representation of the attributes is generated on the page, for example in the form of text, as well as input fields for specifying the attributes. The type of the input fields results herein from the format information assigned to the attributes. Furthermore, a graphic belonging to the attribute group and hyperlinks to further graphics, which may, for example, be assigned to the individual attributes, may be integrated into the page.

In the step 34, the pages having the graphics assigned to the individual attributes are generated. In the step 36, the pages generated in the step 32 and in the step 34 are stored. Subsequently, the index i is incremented by 1. The steps 32 to 36 are then repeated for the various attribute groups i until all of the attribute groups which are stored in the corresponding databank list (cf. databank list 2—Attribute Groups—of FIG. 1), have been processed.

Figure 4:
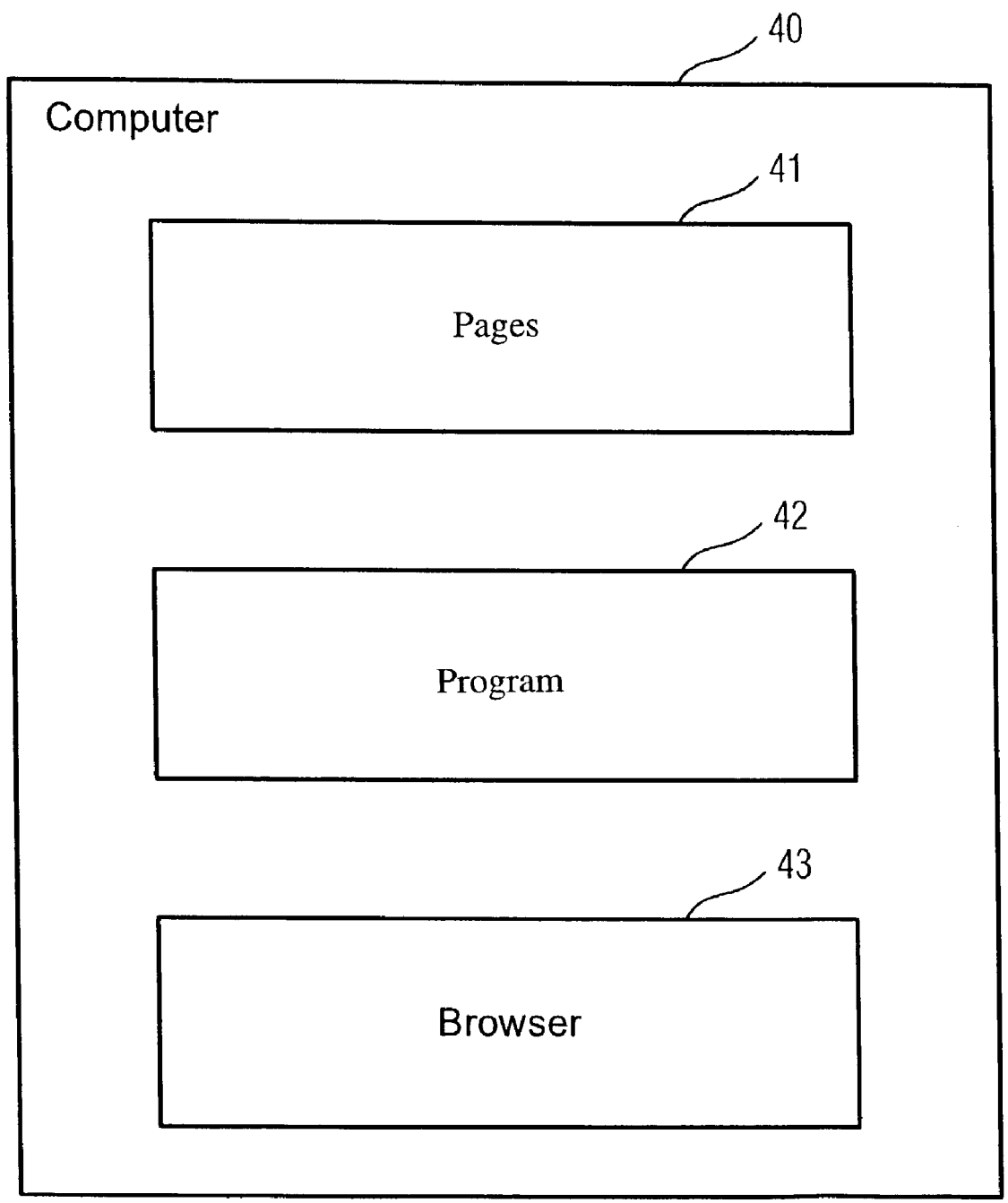
FIG. 4 shows a block diagram of a first embodiment of a software tool according to the present invention.

FIG. 4 shows a computer 40 having a memory 41, into which the pages previously generated using the computer 10 (cf. FIG. 2) have been loaded. The computer 40 also has a program 42 and a browser 43, which is implemented for displaying the pages in the markup language.

The program 42 may, for example, be a plug-in, in particular a Java applet, for the browser 43. A user can have the pages stored in the memory 41 requested and displayed via the browser 43. The user may then input attribute specifications into attribute input fields in one or more of the pages in order to define a product profile for a desired product. The program 42 contains a search function, in order to determine one or more products which correspond to the product profile.

Figure 5:
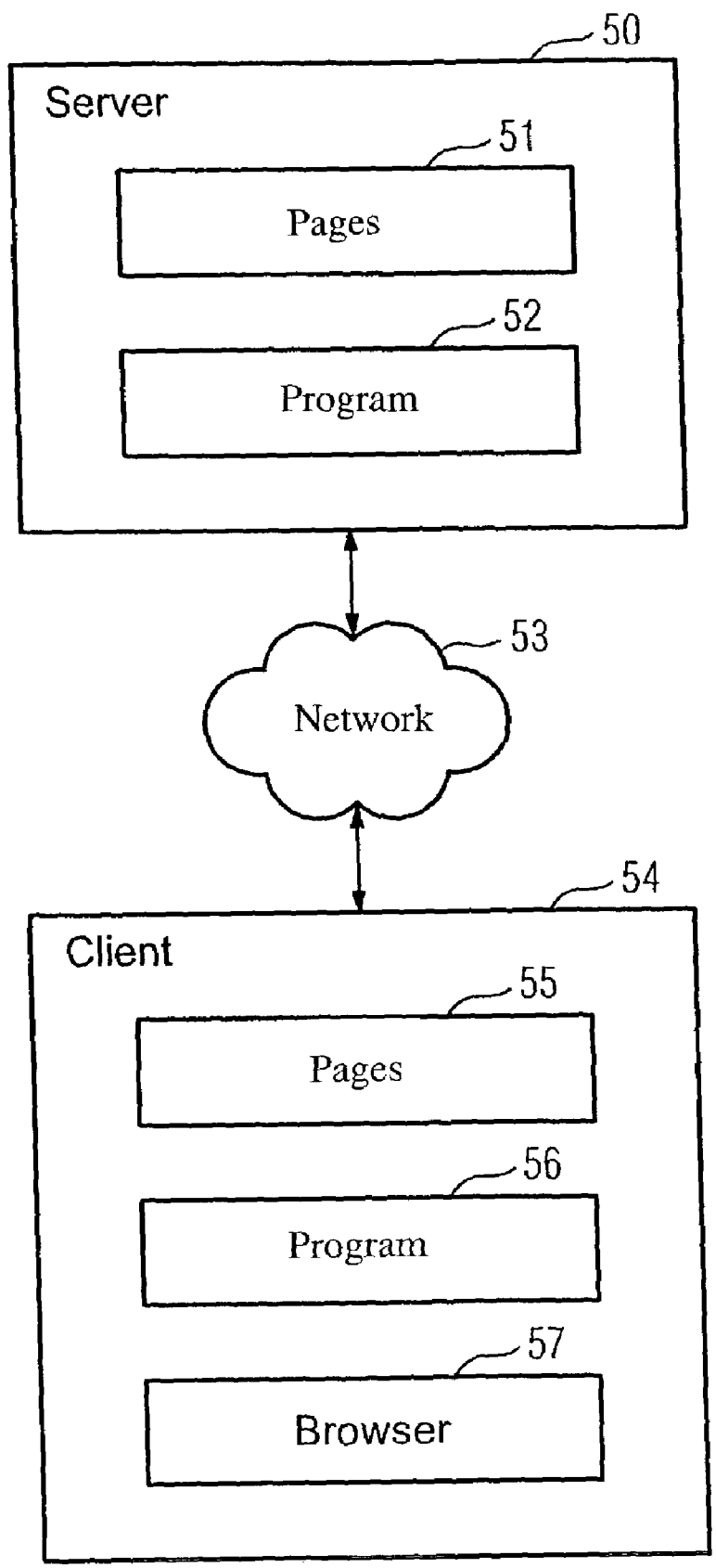
FIG. 5 shows a block diagram of a second embodiment of a software tool according to the present invention.

FIG. 5 shows an alternative embodiment for online implementation, via the Internet, for example.

Pages previously generated in the markup language are stored in a memory 51 on a server computer 50. A program 52 for generating these pages, corresponding to the program 11 in the embodiment of FIG. 2, is also located on the server 50.

A client computer 54 is configured to load the pages into its memory 55 from the memory 51 of the server 50 via a network 53, for example, the Internet. The client 54 also has a program 56, whose functionality corresponds to the program 42 of the embodiment of FIG. 4, as well as a browser 57.

After one or more of the pages are loaded from the server 50 onto the client 54, they are displayed using the browser 57. The user can then input the desired product profile via the corresponding input fields.

Figure 6:
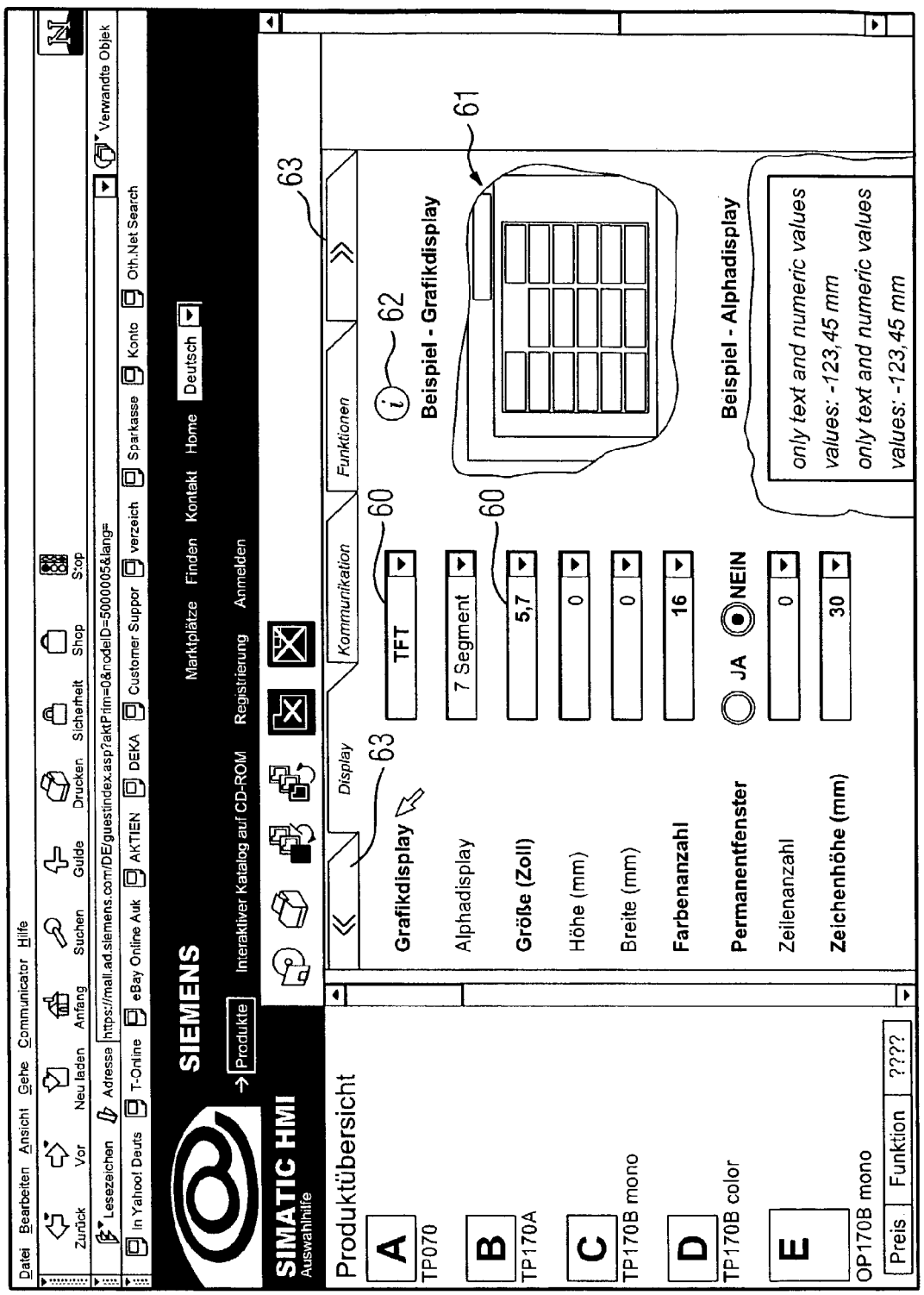
FIG. 6 shows an HTML page with index cards for attribute groups, e.g., "Display"

FIG. 6 shows an example of a page in a markup language, which has been generated for the attribute group "Display". On this page, the attributes "Graphic Display", "Size (in.)", "Height (mm)", "Width (mm)", "Colors", "Permanent Window", and "Character Height (mm)" are specified using text, in a column.

A further column having input fields 60 is located next to the column that specifies the titles of the attributes. The format of the input fields 60 is determined by corresponding control characters, which are assigned to the attributes in the databank. In the exemplary embodiment of FIG. 6, the input fields 60 are either pulldown menus or a Boolean type input field, i.e., for inputting a "yes" or "no" decision.

A graphic 61, which is assigned to the attribute group "Display", is also located on the page. The individual attribute "Graphic Display" is also assigned a further graphic via a hyperlink 62. By clicking the hyperlink 62, the corresponding page is requested.

A list of the available products A to E is located on the left edge of the page under "Product Overview."

To select a specific product, a user inputs his or her specification of the desired product via one or more of the input fields 60. Those available products A to E which do not correspond to this specification are shown "grayed-out" under "Product Overview."

By clicking on "Communication" or "Functions", the user reaches corresponding other pages for the attribute groups "Communication" or "Functions". On the relevant web pages, the user may input further specifications.

The "Product Overview" is maintained even on these further pages. Those products which do not fulfill all of the specifications input by the user on the different pages are displayed grayed.

Figure 7:
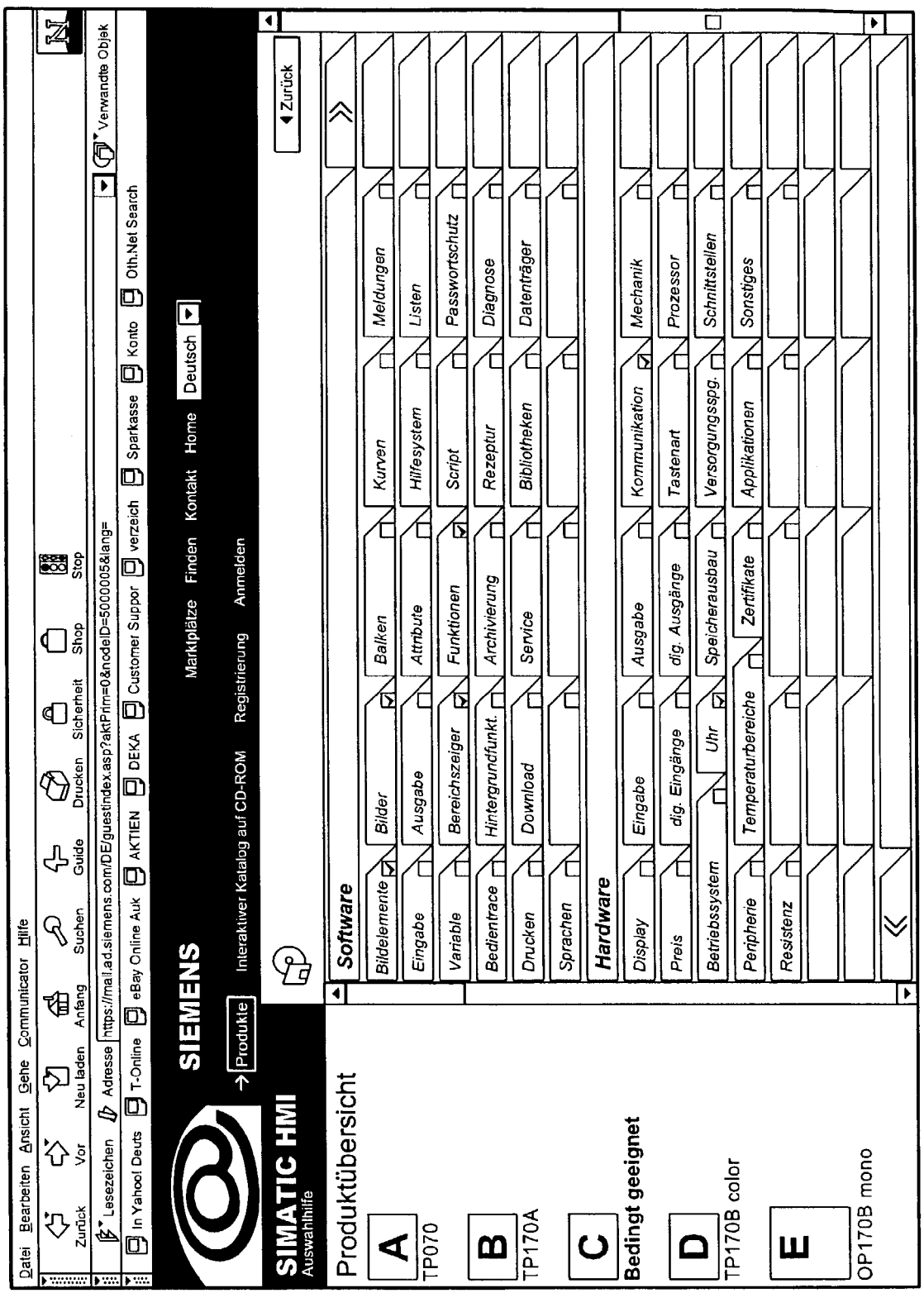
FIG. 7 shows a selection screen for selecting attribute groups.

By clicking the symbols 63, the user reaches the web page illustrated in FIG. 7. On this web page, an overview of all of the attribute groups available is illustrated, grouped according to attribute groups related to software and those related to hardware.

By marking and/or deactivating the attribute groups desired by the user, the web page of FIG. 6 may be tailored to the user requirements, i.e., the attribute groups desired by the user in the page of FIG. 7 are shown using text on the "index card tabs" of FIG. 6, so that the user may rapidly access the page assigned to a corresponding attribute group by clicking.

Figure 8:
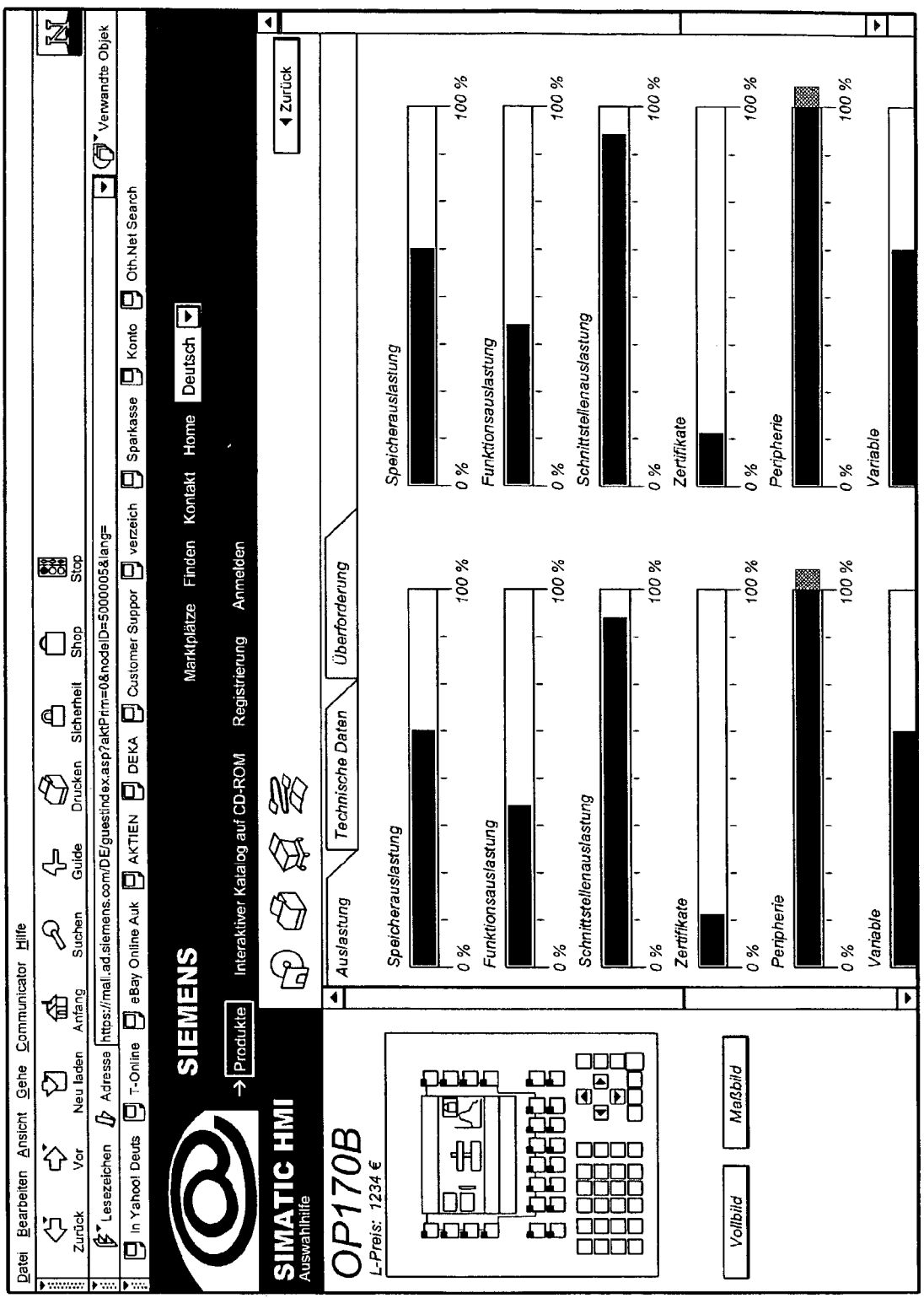
FIG. 8 shows an HTML page for representing the utilization of a selected product in relation to the specified product profile.

By clicking one of the products under "Product Overview", the user may reach the page shown in FIG. 8, which represents the utilization of the selected product in relation to the user specification. A user entry, such as the necessary memory space, is compared with the corresponding attribute of the product. In other words, the memory space actually present, and the corresponding memory utilization is shown in a bar graph as a percentage value. Percentage values of more than 100% are also possible, specifically when the user has selected a grayed product.

It is a particular advantage that the utilization of the selected product for loading in accordance with the profile specified by the user is graphically displayed to the user. Based on this, the user may estimate whether sufficient performance reserves of the product are available for foreseeable future requirements.

Figure 9:
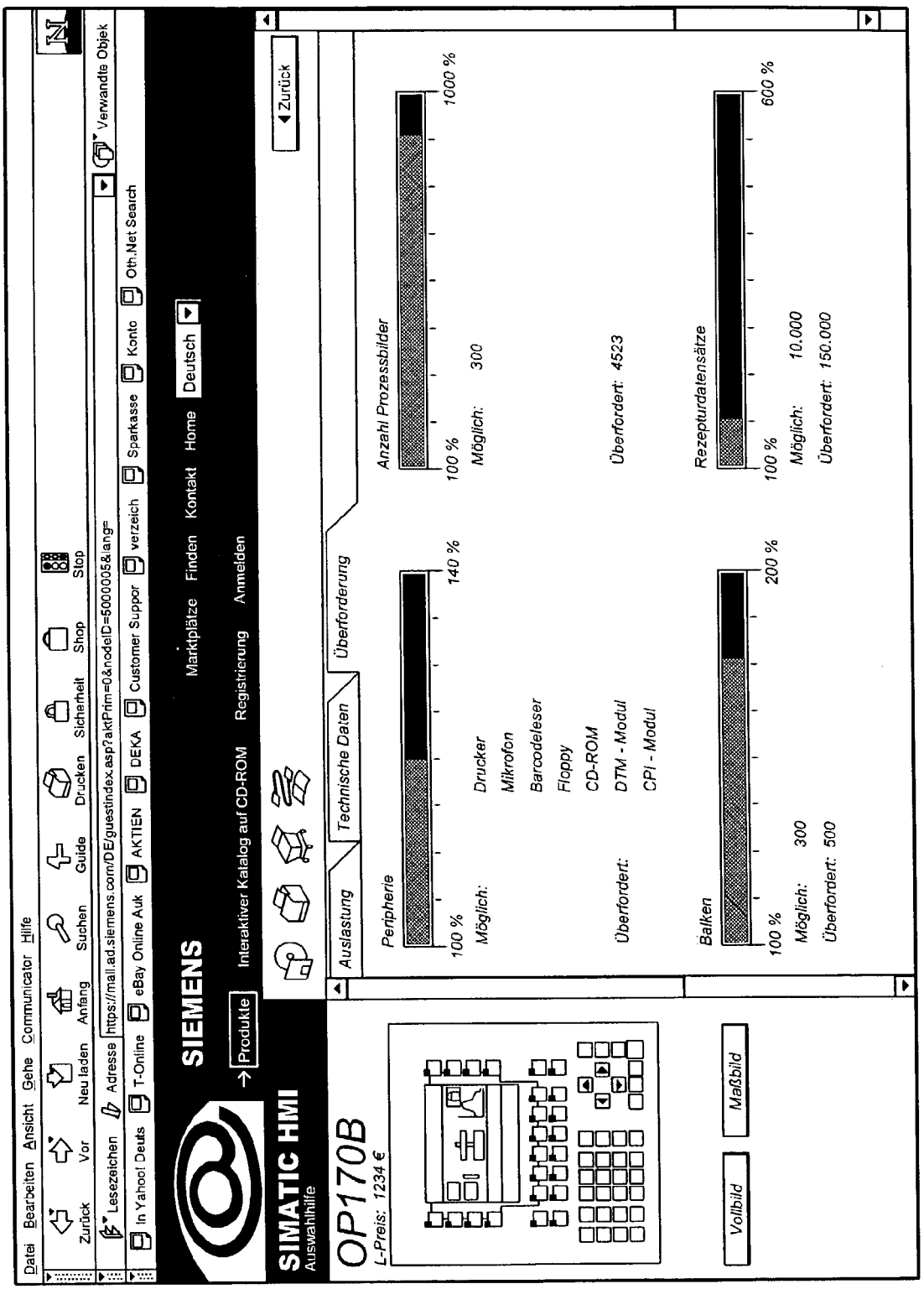
FIG. 9 shows an HTML page with a representation of the excessive demand on the selected product in relation to the specified product profile.

By clicking on the index tab "Excessive Demand" on the page of FIG. 8, the user reaches the page of FIG. 9, where the scale of the excessive demand of the selected product is shown in relation to those attributes which cannot be fulfilled by the product.

To input a specification, i.e., the desired product profile, the user also has the possibility of selecting a specific product and having the software tool according to the present invention search for products comparable to this product. For this purpose, the attributes of the product selected by the user are read from the databank and defined as a specification, i.e., the system searches for those products which at least fulfill the attribute properties of the selected product. These products are then offered to the user for selection.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A computer-implemented method of generating pages in a markup language for selecting products, comprising:
    inputting attribute groups into a databank;
    inputting attributes into the databank, each of the attributes being assigned to one of the attribute groups;
    inputting product information into the databank, each item of the product information being assigned to at least one of the attributes;
    generating a page in the markup language for each of the attribute groups, wherein representations of the attributes are assigned to the respective ones of the attribute groups, and input fields for a user to specify the attributes are generated on each of the pages associated with each of the attribute groups, respectively, wherein the pages display representations of products;
    storing the pages in the markup language for access with a browser program;
    selecting one of the representations of one of the products;
    calculating a utilization for the selected product based on product properties specified by the user;
    graphically displaying the calculated utilization of the selected product in the markup language; and
    calculating a value of an excessive demand on the selected product which fails to correspond to the search profile specified by the user and generating a page in the markup language graphically illustrating the value of excessive demand of the selected product in relation to the property input by the user and displaying the generated page.

2. The method according to claim 1, wherein each of the attributes is assigned format information, and wherein at least some of the attributes is assigned further information, and wherein at least some of the attributes are assigned further information.

3. The method according to claim 2, wherein the format information comprises format specifications for format categories "header", "Boolean, integer", "floating point", and "list", and wherein the further information comprises at least one of ToolTips, explanatory graphics and units.

4. The method according to claim 1, further comprising:
    inputting graphics for the attribute groups into the databank; and
    inputting graphics for the product information into the databank.

5. The method according to claim 4, wherein the graphics comprise graphic ToolTips.

6. The method according to claim 1, further comprising:
    inputting help texts in a first language into the databank; and
    inputting help texts in a second language into the databank, wherein the help texts are each assigned respectively to one of the attributes, one of the input fields, or both one of the attributes and one of the input fields.

7. The method according to claim 1, wherein the databank is a relational database.

8. The method according to claim 1, wherein the attributes are parameters of a product categorized by respective attribute groups.

9. The method according to claim 8, wherein the user specifies a value for a respective parameter of the product in at least some of the input fields.

10. The method according to claim 9, further comprising:

reading the value specified by the user in the at least some of the input fields;

searching for products that meet the parameters specified by the user in the at least some of the input fields; and providing the user with found products.

11. The method according to claim 1, wherein the attributes are characteristics of a product and wherein, for each of the attributes, an input field is provided where the user specifies a value for the attribute.

12. The method according to claim 11, wherein, when an attribute is not available for the product, the input field of the attribute is disabled.

13. The method according to claim 1, wherein the calculated utilization of the selected product shows a relationship between an actual value of a product property of the selected product and a value of the product property input by the user.

14. The method according to claim 13, wherein the calculated utilization is displayed as a ratio between the actual value of the product property of the selected product and the value of the product property input by the user.

15. The method according to claim 1, wherein the selected product is an individual tangible product.

16. A computer-readable medium storing instructions for selecting products, comprising:

pages in a markup language, wherein each of the pages is respectively associated with one of a plurality of attribute groups, wherein each of the pages respectively includes both representations of attributes assigned to the one attribute group of the associated page and input fields for a user to select the represented attributes, and wherein the pages display representations of products; and a program module utilizing a browser program to perform at least one of displaying the pages, searching the pages, and analyzing the pages in the markup language, a software component that selects one of the representations of one of the products;

a software component that calculates a utilization for the selected product based on product properties specified by the user and that graphically displays the calculated utilization of the selected product in the markup language and a value of an excessive demand on the selected product which fails to correspond to the search profile specified by the user; and a software component that generates a page in the markup language graphically illustrating the value of excessive demand of the selected product in relation to the property input by the user and displaying the generated page.

17. The computer-readable medium according to claim 16, wherein the representations of those of the products which fail to correspond to a search profile specified by the user are displayed in gray-tone.

18. The computer-readable medium according to claim 16, further comprising:

a software component that processes a selection of a representation of a product into a selection of the attributes associated with the selected product and that utilizes the associated attributes to specify the products searched for.

19. The computer-readable medium according to claim 16, wherein the program module is a plug-in for the browser program.

20. The computer-readable medium of claim 16, wherein the calculated utilization of the selected product shows a relationship between an actual value of a product property of the selected product and a value of the product property input by the user.

21. The computer-readable medium of claim 20, wherein the calculated utilization is displayed as a ratio between the actual value of the product property of the selected product and the value of the product property input by the user.

* * * * *